US012127322B2

(12) United States Patent
Jeong et al.

(10) Patent No.: US 12,127,322 B2
(45) Date of Patent: Oct. 22, 2024

(54) COOKING APPLIANCE

(71) Applicant: Samsung Electronics Co., Ltd., Suwon-si (KR)

(72) Inventors: Jiho Jeong, Suwon-si (KR); Kyungjin Kim, Suwon-si (KR); Eonjoong Kim, Suwon-si (KR); Inki Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 17/248,233

(22) Filed: Jan. 15, 2021

(65) Prior Publication Data

US 2021/0227647 A1 Jul. 22, 2021

(30) Foreign Application Priority Data

Jan. 17, 2020 (KR) ........................ 10-2020-0006699
May 15, 2020 (KR) ........................ 10-2020-0058403

(51) Int. Cl.

*H05B 6/64* (2006.01)
*H05B 1/02* (2006.01)
*H05B 3/42* (2006.01)

(52) U.S. Cl.

CPC ........... *H05B 6/647* (2013.01); *H05B 1/0263* (2013.01); *H05B 3/42* (2013.01); *H05B 6/6494* (2013.01); *H05B 2203/005* (2013.01)

(58) Field of Classification Search

CPC ........ H05B 6/647; H05B 1/0263; H05B 3/42; H05B 6/6494

(Continued)

(56) References Cited

U.S. PATENT DOCUMENTS 3,878,350 A * 4/1975 Takagi ................. H05B 6/6482 219/757
4,298,780 A * 11/1981 Suzuki ................. H05B 6/6482 219/685

(Continued)

FOREIGN PATENT DOCUMENTS

CN 1162090 A 10/1997
GB 2302462 A 1/1997

(Continued)

OTHER PUBLICATIONS

International Search Report of the International Searching Authority in connection with International Application No. PCT/KR2021/000621 issued May 3, 2021, 3 pages.

(Continued)

*Primary Examiner* — Nathaniel E Wiehe
*Assistant Examiner* — Thomas J Ward

(57) ABSTRACT

A cooking appliance including a cooking chamber configured to cook food therein and openable in a first direction, a shelf provided to be inserted into the cooking chamber in the first direction and on which food is placed, and a plurality of heaters configured to supply heat to the shelf and disposed at one side of the cooking chamber. Where the shelf includes a first area arranged at one side in a second direction perpendicular to the first direction and a second area arranged at another side in the second direction. The plurality of heaters includes a first heater disposed to correspond to the first area in a third direction perpendicular to the first and second areas and a second heater disposed to correspond to the second area in the third direction. The plurality of heaters configured to provide more heat to the first area than to the second area.

14 Claims, 11 Drawing Sheets

(58) Field of Classification Search
USPC .......................................................... 219/685
See application file for complete search history.

(56) References Cited

U.S. PATENT DOCUMENTS

| | | | | |
|---|---|---|---|---|
| 5,352,873 | A | 10/1994 | Carlsson et al. | |
| 6,927,364 | B2 | 8/2005 | Ko | |
| 9,781,777 | B2 * | 10/2017 | Jeon | H05B 6/6408 |
| 2004/0232141 | A1 | 11/2004 | Yamasaki et al. | |
| 2007/0257020 | A1 | 11/2007 | Nam et al. | |
| 2016/0192446 | A1 | 6/2016 | Seddik | |
| 2016/0242240 | A1 | 8/2016 | Lee et al. | |
| 2018/0324908 | A1 | 11/2018 | Denker et al. | |
| 2018/0340692 | A1 | 11/2018 | Kwag et al. | |

FOREIGN PATENT DOCUMENTS

| | | | |
|---|---|---|---|
| JP | 2001-076854 | A | 3/2001 |
| JP | 2004-108606 | A | 4/2004 |
| JP | 2004-333109 | A | 11/2004 |
| JP | 2007-064530 | A | 3/2007 |
| JP | 5899426 | B2 | 4/2016 |
| KR | 10-2003-0050922 | A | 6/2003 |
| KR | 20-0396178 | Y1 | 9/2005 |
| KR | 10-2007-0108022 | A | 11/2007 |
| KR | 10-0872238 | B1 | 12/2008 |
| KR | 10-2009-0071253 | A | 7/2009 |
| KR | 10-2012-0016919 | A | 2/2012 |
| KR | 10-1176130 | B1 | 8/2012 |
| KR | 10-1395482 | B1 | 5/2014 |
| KR | 10-1732163 | B1 | 5/2017 |
| KR | 10-1738634 | B1 | 7/2017 |
| KR | 10-1851219 | B1 | 6/2018 |
| WO | 2019244802 | A1 | 12/2019 |

OTHER PUBLICATIONS

European Patent Office, “Supplementary European Search Report,” dated Aug. 31, 2022, in connection with European Patent Application No. 21740938.2, 7 pages.

Communication pursuant to Article 94(3) EPC dated Feb. 20, 2024, in connection with European Patent Application No. 21740938.2, 7 pages.

Office Action issued Jun. 25, 2024, in connection with Korean Patent Application No. 10-2020-0058403, 22 pages.

* cited by examiner

COOKING APPLIANCE

CROSS-REFERENCE TO RELATED APPLICATIONS

This application is based on and claims priority under 35 U.S.C. § 119 to Korean Patent Applications No. 10-2020-0006699, filed on Jan. 17, 2020 and No. 10-2020-0058403, filed on May 15, 2020 in the Korean Intellectual Property Office, the disclosures of which are incorporated herein by reference.

BACKGROUND

1. Field

The disclosure relates to a cooking appliance, and more specifically, to partitioning a cooking space inside a cooking chamber.

2. Description of the Related Art

A cooking appliance is a device for cooking by heating a cooking object, such as food, and providing various cooking related functions, such as heating, defrosting, drying, and sterilization of cooking objects. Examples of such cooking appliances include an oven, such as a gas oven or an electric oven, a microwave heating device (hereinafter, referred to as a microwave), a gas stove, an electric stove, a gas grill, or an electric grill.

In general, an oven refers to a device that cooks food by directly transferring heat to the food through a heating source that generates heat, such as a heater, or by heating the inside of a cooking chamber, and a microwave refers to a device that cooks food by disturbing the molecular arrangement of the food using high frequency waves as a heating source and using frictional heat between molecules generated due to the disturbance of the molecular arrange of the food.

When two or more different food items are cooked through a cooking appliance, the optimum temperatures for cooking the individual food items may be different. In this case, the cooking appliance is capable of cooking food only at the same temperature, and when the different food items are cooked through the cooking appliance at the same time, some food item may have poor cooking conditions.

SUMMARY

Therefore, it is an object of the disclosure to provide a cooking appliance in which, when two or more different food items are simultaneously cooked by the cooking appliance, each food item may be cooked at a different optimum temperature.

It is another object of the disclosure to provide a cooking appliance capable of easily cooking two or more different food items in a cooking chamber by efficiently partitioning a cooking area Additional aspects of the disclosure will be set forth in part in the description which follows and, in part, will be obvious from the description, or may be learned by practice of the disclosure.

According to an aspect of the disclosure, there is provided a cooking appliance including: a cooking chamber configured to cook food therein and openable in a first direction; a shelf provided to be inserted into the cooking chamber in the first direction and on which food is placed; and a plurality of heaters configured to supply heat to the shelf and disposed at one side of the cooking chamber, wherein the shelf includes a first area arranged at one side in a second direction perpendicular to the first direction and a second area arranged at an other side in the second direction; the plurality of heaters includes a first heater disposed to correspond to the first area in a third direction perpendicular to the first and second areas and a second heater disposed to correspond to the second area in the third direction; and the plurality of heaters are provided to cause heat supplied to the first area to be more than heat supplied to the second area.

The plurality of heaters may each have a long axis extending in the first direction and are spaced apart from each other in the second direction.

The plurality of heaters may generate heat independent of each other.

The shelf may include a long side extending in the second direction and a short side extending in the first direction.

The cooking appliance may further include a power supply configured to supply electricity to the plurality of heaters, wherein the plurality of heaters each include a body portion and electricity connectors disposed at both end portions of the body portion in a direction the long axis extends and electrically connected to the power supply.

The cooking appliance may further include a wire connecting the power supply to each of the electricity connectors, wherein the electricity connectors may be coupled to the wire in the third direction.

Each of the electricity connectors may include a flange extending in the first direction and a fastening member fastened to the flange in the third direction such that the flange is coupled to the wire.

The shelf may include a third area arranged between the first area and the second area in the second direction, the plurality of heaters may further include a third heater disposed to correspond to the third area in the third direction, and the plurality of heaters may be provided to supply a different amount of heat to each of the first, second, and third areas.

The cooking appliance may further include a magnetron disposed at a side opposite to the plurality of heaters in the cooking chambers and generating high frequency waves to be supplied to the shelf, wherein the shelf further may include a heat generating portion that is heated by the high frequency waves generated by the magnetron.

The shelf may include a first surface in which the first and second areas are located, and a second surface opposite to the first surface in the third direction, on which the heat generating portion is arranged, wherein the heat generating portion may be provided to cover the first and second areas in the second direction.

The heat generating portion may be provided to supply a same amount of heat to each of the first area and the second area.

The heat generating portion may be formed of ferrite.

The cooking appliance may further include an auxiliary heater disposed at a side opposite to the plurality of heaters in the cooking chamber, and supplying heat to the shelf.

The first heater may be provided to generate an amount of heat that is equal as or greater than an amount of heat generated by the second heater.

The body portion may include a heating area in which heat is generated by a heat generator and a non-heating area formed between the heating area and the electricity connector and generating no heat, wherein the plurality of heaters are disposed such that the heating area is not being exposed outside of the cooking chamber.

According to another aspect of the disclosure, there is provided a cooking appliance including: a cooking chamber configured to cook food therein and openable in a first direction; and a plurality of heaters configured to supply heat to the food and disposed at one side of the cooking chamber, wherein the plurality of heaters each have a long axis extending in the first direction, a first heater among the plurality of heaters is disposed at a first position in a second direction perpendicular to the first direction with reference to a center of the cooking chamber, and a second heater among the plurality of heaters is disposed at a second position opposite to the first position in the second direction with reference to the center of the cooking chamber.

The cooking appliance may further include a shelf provided to be inserted into the cooking chamber in the first direction and on which food is placed, wherein the shelf may include a first area supplied with heat by the first heater and a second area supplied with heat by the second heat, and the first area and the second area may each be supplied with a different temperature of heat.

A third heater among the plurality of heaters may be disposed between the second position and the first position.

The shelf may include a long side extending in the second direction and a short side extending in the first direction.

According to another aspect of the disclosure, there is provided a cooking appliance including: a cooking chamber configured to cook food therein and openable in a first direction; a shelf provided to be inserted into the cooking chamber in the first direction and on which food is placed; and a heating source configured to supply heat to the shelf, wherein the heating source includes a plurality of heaters disposed at one side of the cooking chamber and supplying heat to one side of the shelf, and a magnetron disposed at an other side of the cooking chamber and generating high frequency waves to be supplied to an other side of the shelf, and the plurality of heaters each have a long axis extending in the first direction and are arranged spaced apart from each other in a second direction perpendicular to the first direction.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
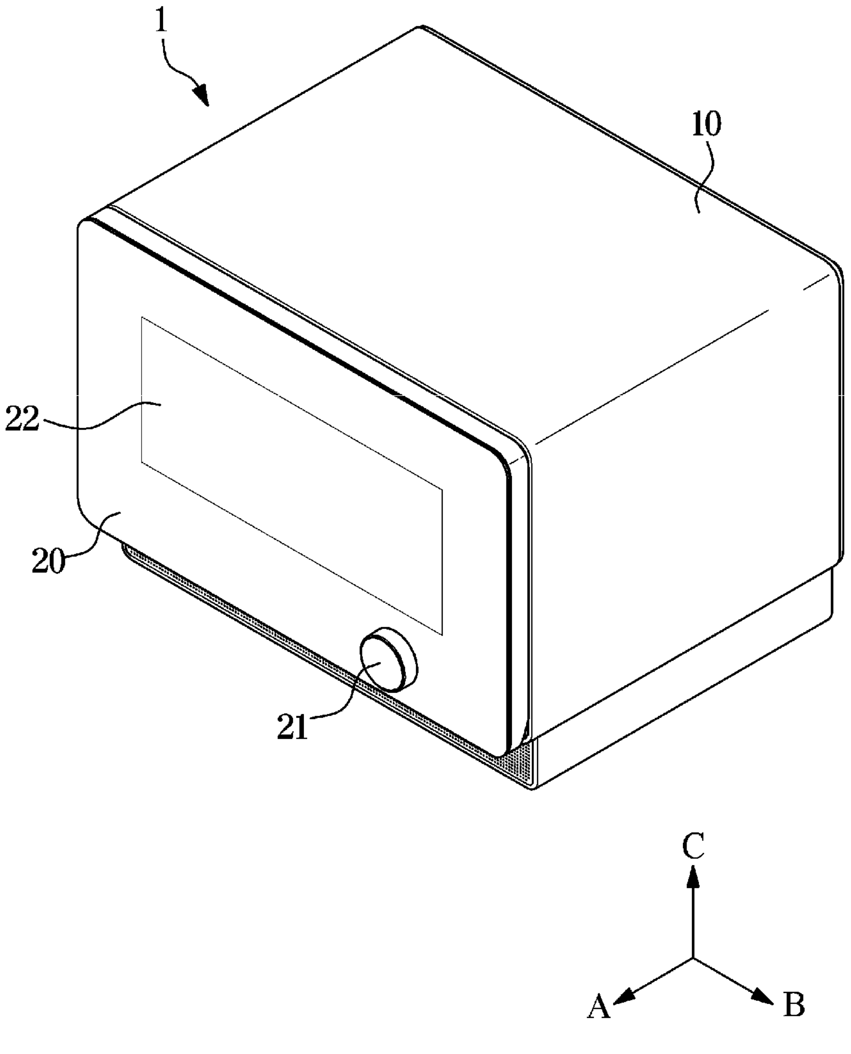
FIG. 1 is a perspective view illustrating a cooking appliance according to an embodiment of the disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments set forth herein and illustrated in the configuration of the disclosure are only the most preferred embodiments and are not representative of the full the technical spirit of the disclosure, so it should be understood that they may be replaced with various equivalents and modifications at the time of the disclosure.

Throughout the drawings, like reference numerals refer to like parts or components.

The terminology used herein is for the purpose of describing particular embodiments only and is not intended to restrict and/or limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, area, layer or section discussed below could be termed a second element, component, area, layer or section without departing from the teachings of the disclosure. Descriptions shall be understood as to include any and all combinations of one or more of the associated listed items when the items are described by using the conjunctive term "~ and/or ~," or the like.

In a cooking appliance according to an embodiment of the disclosure, a microwave is used as an example of the cooking appliance. However, the disclosure is not limited thereto, and the cooking appliance according to the embodiment of the disclosure may be applied to other cooking appliances, such as an oven.

Hereinafter, embodiments of the disclosure will be described in detail with reference to the accompanying drawings.

Figure 2:
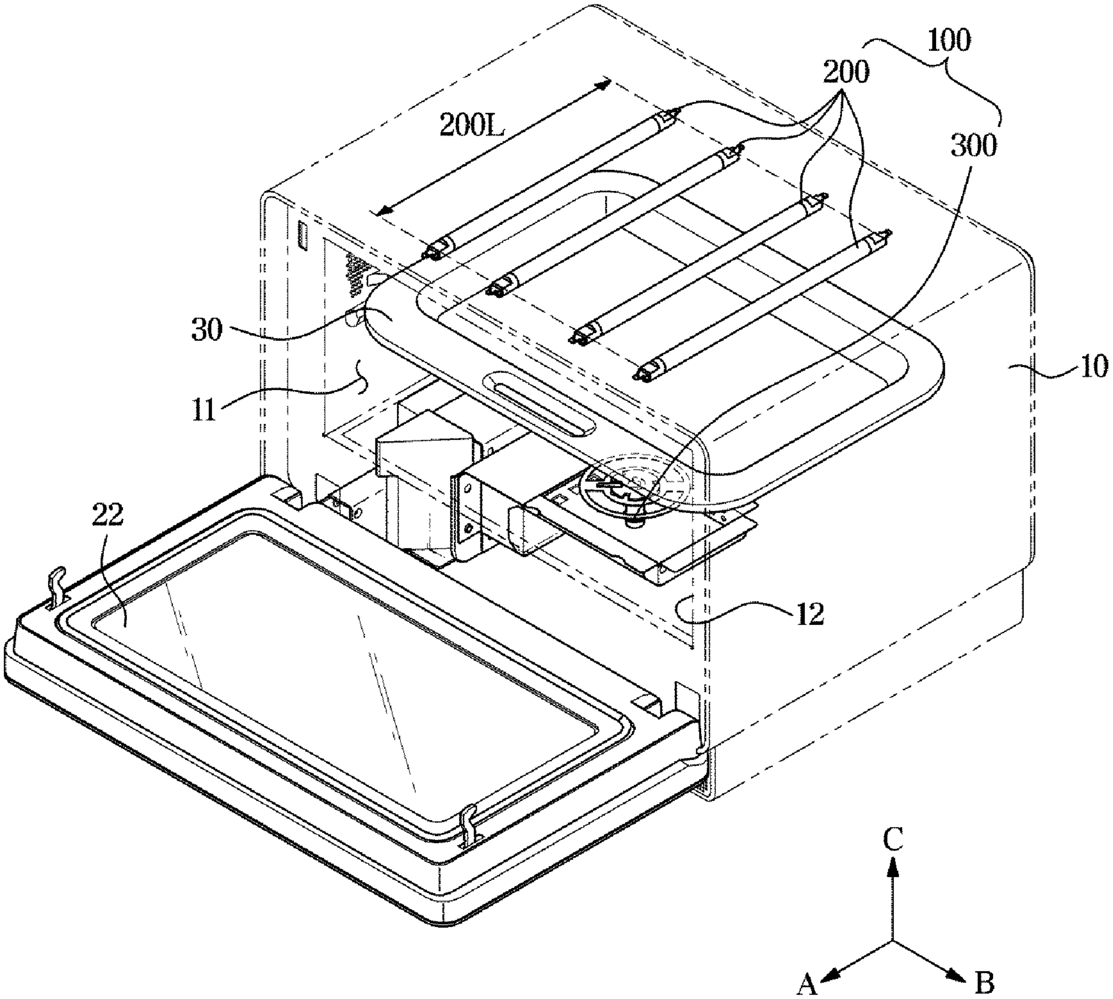
FIG. 2 is a diagram illustrating internal components of the cooking appliance according to the embodiment of the disclosure.
Figure 3:
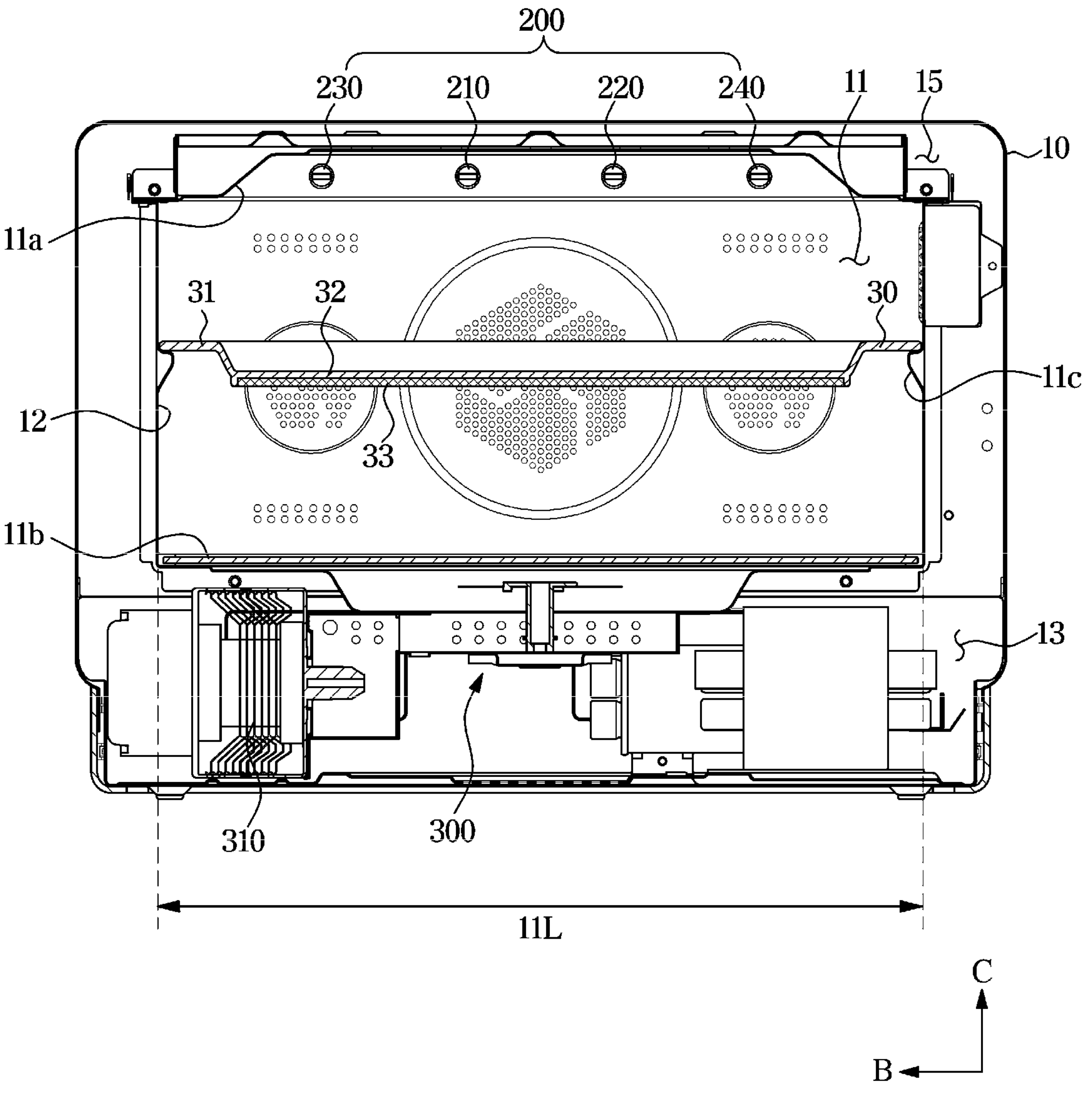
FIG. 3 is a cross-sectional view illustrating the cooking appliance according to the embodiment of the disclosure.

FIG. 1 is a perspective view illustrating a cooking appliance 1 according to an embodiment of the disclosure, FIG. 2 is a diagram illustrating internal components of the cooking appliance 1 according to the embodiment of the disclosure, and FIG. 3 is a cross-sectional view illustrating the cooking appliance 1 according to the embodiment of the disclosure.

The cooking appliance 1 may include a housing 10 forming the external appearance thereof and a cooking chamber 11 provided inside the housing 10 and in which cooking objects may be placed.

The cooking appliance 1 may include an inner housing 12 disposed inside the housing 10 and forming the cooking chamber 11. Between the inner housing 12 and the housing 10, a predetermined space 15 may be formed.

The housing 10 and the inner housing 12 may be provided to be open in a first direction A, which is a forward direction of the cooking appliance 1.

A user may place a cooking object in the cooking chamber 11 through the opening of the inner housing 12 formed in the first direction A.

The cooking chamber 11 may be provided in a substantially rectangular parallelepiped shape having a long side in a second direction B perpendicular to the first direction A in a left-right direction.

The cooking appliance 1 may include a machine room 13 formed in the housing 10 and disposed below the cooking chamber 11. Various electrical components for driving the cooking appliance 1 may be disposed inside the machine room 13.

The cooking appliance 1 may include a door 20 provided to open and close the openings of the housing 10 and the inner housing 12.

The door 20 may include an inputter 21 for inputting a signal that allows a user to control the cooking appliance 1. The inputter 21 is not limited to the example shown in FIG. 1 and may include a display unit (not shown) displaying an image or a touch unit (not shown) provided to input a signal by touching an image.

The door 20 may include a transparent member 22 provided to allow a user to observe the inside of the cooking compartment 11 when the door 20 is closed.

The cooking appliance 1 may include a shelf 30 mounted inside the cooking chamber 11 and provided to allow a user to place food thereon. The shelf 30 may be separably disposed inside the cooking chamber 11.

The cooking chamber 11 may include support portions 11*c* formed on both sides of the cooking chamber 11 so that the shelf 30 is mounted between an upper surface 11*a* and a lower surface 11*b* of the cooking chamber 11.

The support portion 11*c* may be provided in a plurality of units thereof and arranged in a third direction C perpendicular to the first direction A or the second direction B in the upper side and lower side direction so that the shelf 30 is mounted at various heights.

The shelf 30 may include a main body 31 and a cooking surface 32 on which food may be placed. The cooking surface 32 may be provided to face the upper surface 11*a* of the cooking chamber 11 when the shelf 30 is mounted.

The cooking appliance 1 may include a heating source 100 that supplies heat to the inside of the cooking chamber 11 so that the cooking object is cooked by the heat.

The heating source 100 may be provided to supply heat to the cooking object placed on the shelf 30 so that the cooking object is cooked. In addition, the cooking object may be placed on the lower surface 11*b* of the cooking chamber 11 without the shelf 30. Even in this case, the heating source 100 may supply heat to the cooking object located on the lower surface 11*b*.

The heating source 100 may include a first heating source 200 disposed on the upper surface 11*a* of the cooking chamber 11.

The heating source 100 may include a second heating source 300 disposed on the lower surface 11*b* of the cooking chamber 11.

The first heating source 200 may include a plurality of heaters 210, 220, 230, and 240 that generate radiant heat. The plurality of heaters 210, 220, 230, and 240 may radiate heat generated by itself so as to be directly transferred to the cooking object.

The second heating source 300 may include a magnetron 310 generating high frequency waves. The high frequency waves generated by the magnetron 310 may be scanned into the inside of the cooking object, in which the molecular arrangement of moisture contained in the cooking material is repeatedly changed to generate frictional heat between the molecules by which the inside of the cooking object is cooked.

The magnetron 310 may be disposed in the machine room 13. The second heating source 300 may oscillate a high frequency waves from the machine room 13 toward the lower surface 11*b* of the cooking chamber 11 and the high frequency waves may pass through the lower surface 11*b* to be transmitted to the shelf 30.

The conventional microwave-type cooking appliance is provided to cook a cooking object through a single magnetron. In this case, the high frequency waves is not transferred evenly to all parts of the cooking object depending on the moisture distribution or content of the cooking object, so that the cooking object is not efficiently cooked.

The above described limitation has been eliminated by additionally installing a heater capable of transferring heat to the entire area of the cooking object in the microwave. In particular, in the case of a cooking object that needs to be heated outside the cooking object at a higher temperature, heat from the additional heater may allow more efficient cooking.

The cooking appliance 1 according to the embodiment of the disclosure may also include the first heating source 200 and the second heating source 300 such that the cooking object may be efficiently cooked.

Since the first heating source 200 is disposed on the upper surface 11*a* of the cooking chamber 11 as described above, radiant heat may be efficiently transferred to an upper side of the cooking object, but have difficulty in reaching a lower side of the cooking object may not be easily supplied with heat.

In this case, in order for the lower side of the cooking object to be supplied with additional heat, the user can stop the cooking appliance 1 in operation, withdraw the shelf 30 from the cooking chamber 11, turn the cooking object over, insert the shelf 30 into the cooking chamber 11, and restart the cooking appliance 1, which causes inconvenience to the user.

In order to remove such an inconvenience, the cooking appliance 1 according to the embodiment of the disclosure may include a heat generating portion 33 disposed on the shelf 30 such that heat is transferred even to the lower side of the cooking object during cooking.

The heat generating portion 33 may be disposed on a side of the main body 31 of the shelf 3 opposite to the cooking surface 32. The heat generating portion 33 may be provided to face the lower surface 11*b* of the cooking chamber 11 when the shelf 30 is mounted on the cooking chamber 11.

The heat generating portion 33 may generate heat by absorbing high frequency waves generated by the magnetron 310. The heat generating portion 33 may absorb the high frequency waves transmitted from the magnetron 310 facing the heat generating portion 33, and the heat generating portion 33 may generate heat by the absorbed high frequency waves.

The heat generated by the heat generating portion 33 may be transferred to the cooking surface 32 through the main body 31 of the shelf 30.

That is, as heat generated from the heat generating portion 33 is be conducted to the cooking surface 32, the lower side of the cooking object located on the cooking surface 32 may be supplied with the heat.

The heat generating portion 33 may be formed of a ferrite material to absorb high frequency waves. However, the disclosure is not limited thereto, and the heat generating portion 33 may be formed of a material capable of generating heat by high frequency waves in a mixture with ceramic or the like.

Accordingly, heat may be supplied to the cooking object in the upper and lower side direction of the cooking object without the user needing to additionally turn over the cooking object, so that cooking may be efficiently performed.

In general, the cooking appliance 1 having a rectangular parallelepiped-shaped cooking chamber 11 having a long side 11L in the second direction B as in the embodiment of the disclosure may include a plurality of heaters having a long axis extending in the direction of the long side 11L of the cooking chamber 11.

That is, in the conventional technology, a plurality of heaters each have a long axis extending in the second direction B, and the plurality of heaters are provided to be spaced apart from each other in the first direction A in the cooking chamber 11.

This is to improve the installation of a plurality of heaters inside the cooking chamber 11 having a long side 11L in the second direction B. In order for the plurality of heaters to generate heat, power can be supplied to the plurality of heaters. To this end, wires can be connected to both end portions of each of the plurality of heaters.

In a case in which the cooking chamber 11 is formed long in the second direction B and relatively short in the first direction A, when a plurality of heaters extending in the first direction A are disposed, a space for connecting the plurality of heaters extending in the first direction A to wires is too narrow, which cause a difficulty in connecting the wires supplying power to the plurality of heaters, so that the installation of the plurality of heaters may be degraded. This will be described in detail.

In many cases, a plurality of cooking objects having different cooking temperatures are simultaneously placed in a cooking chamber in a cooking appliance and cooked. In this case, the cooking appliance according to the disclosure may individually set the plurality of heaters to generate different temperatures of heat.

That is, the amount of heat generated by one of the plurality of heaters may be set to be different from that generated by another heater, so that different temperatures of heat may be transferred to the plurality of cooking objects.

When a plurality of heaters are disposed on the upper surface 11*a* of the cooking chamber 11 and provide different temperatures of heat as in the embodiment of the disclosure, a respective location corresponding to each heater in the third direction C in the cooking chamber 11 may be provided with a temperature of heat corresponding to heat generated by the corresponding heater and a temperature of heat corresponding to the heat.

In detail, the cooking surface 32 of the shelf 30 may be partitioned into areas formed to be supplied with different temperatures.

The cooking surface 32 may be provided with a plurality of areas at positions corresponding to respective heaters in the third direction C. Each area may be provided to be directly supplied with different heat generated from each heater.

Accordingly, even when a plurality of cooking objects having different cooking temperatures are placed in the cooking chamber at the same time, each cooking object may be cooked according to a different cooking temperature by disposing the respective cooking objects in a plurality of areas of the cooking surface 32 divided based on the cooking temperatures. That is, when each cooking object is placed in a different area, the cooking object may be cooked at a different temperature.

In the conventional technology, in which a plurality of heaters are disposed apart from each other in the first direction A, a plurality of areas for receiving different temperatures of heat may be divided in the first direction A.

The cooking chamber 11 according to the disclosure is provided in a rectangular parallelepiped shape having the long side 11L extending in the second direction B, and the shelf 30 corresponding to the cooking chamber 11 includes the cooking surface 32 in a rectangular shape having a long side in the second direction B and a short side in the first direction A.

When a plurality of areas are divided in the first direction A, which is a short side direction of the cooking surface 32, the plurality of areas in the first direction A are caused to have extended lengths that are short.

Accordingly, when cooking a bulky cooking object, the cooking object is caused to be disposed over a plurality of areas having different temperatures, so that a part of the cooking object may not be cooked at an appropriate temperature.

In addition, the user may observe each cooking object from the outside of the cooking appliance 1 through the transparent member 22, and when one of a plurality of cooking objects is disposed deeply in the first direction A, the user may have a difficulty in observing the cooking object.

In order to alleviate such a limitation, the plurality of heaters 210, 220, 230, and 240 of the cooking appliance 1 according to the embodiment of the disclosure are each provided to have a long axis 200L extending in the first direction A while being spaced apart from each other in the second direction B corresponding to the extending direction of the long side 11L of the cooking chamber 11.

Accordingly, a plurality of areas to be supplied with different temperatures of heat on the cooking surface 32 of the shelf 30 may be divided along the second direction B. Hereinafter, the plurality of heaters 210, 220, 230, and 240 according to the embodiment of the disclosure and the plurality of areas divided in the shelf 30 will be described in detail.

Figure 4:
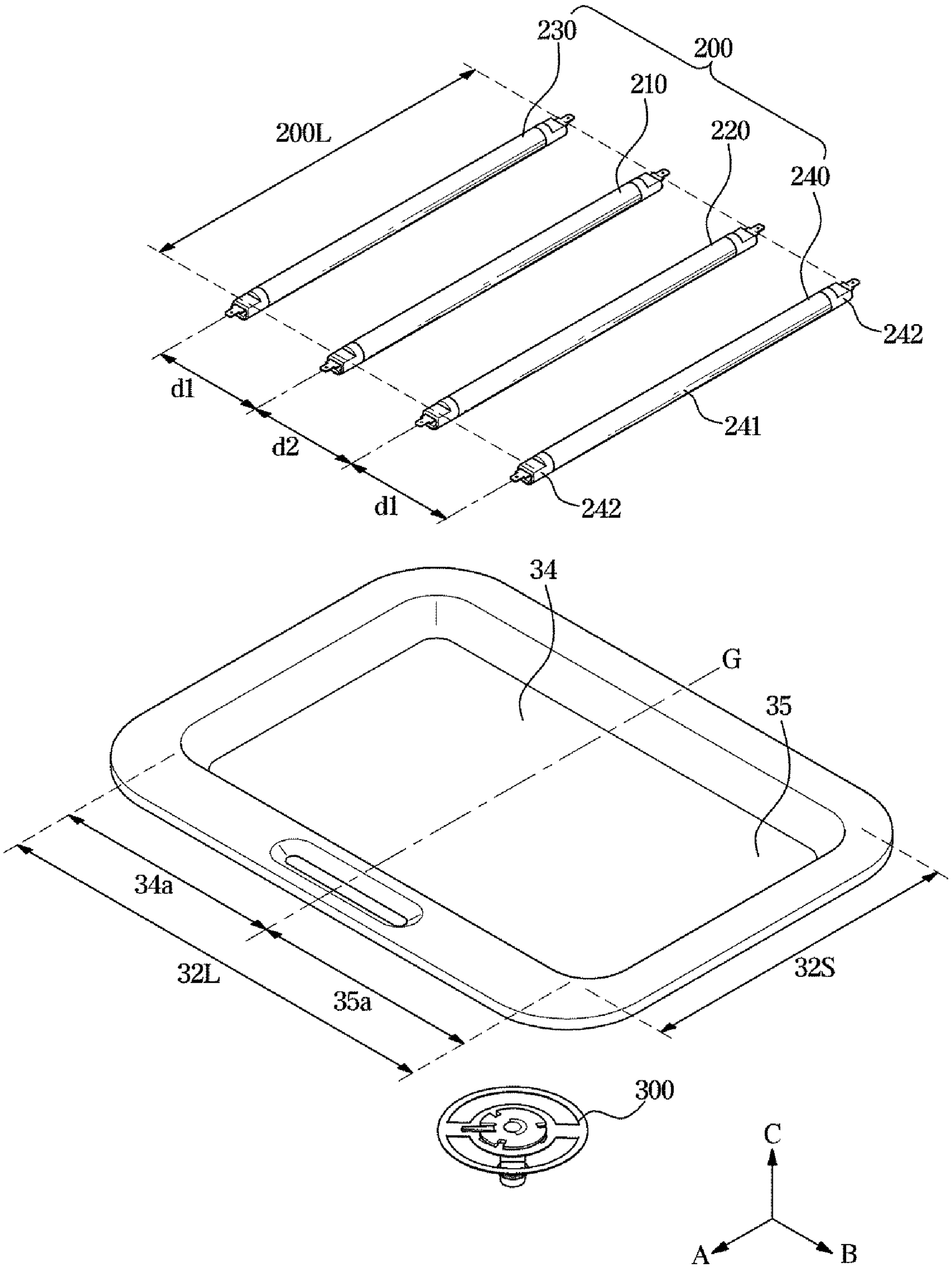
FIG. 4 is a view illustrating some components of the cooking appliance according to the embodiment of the disclosure.
Figure 5:
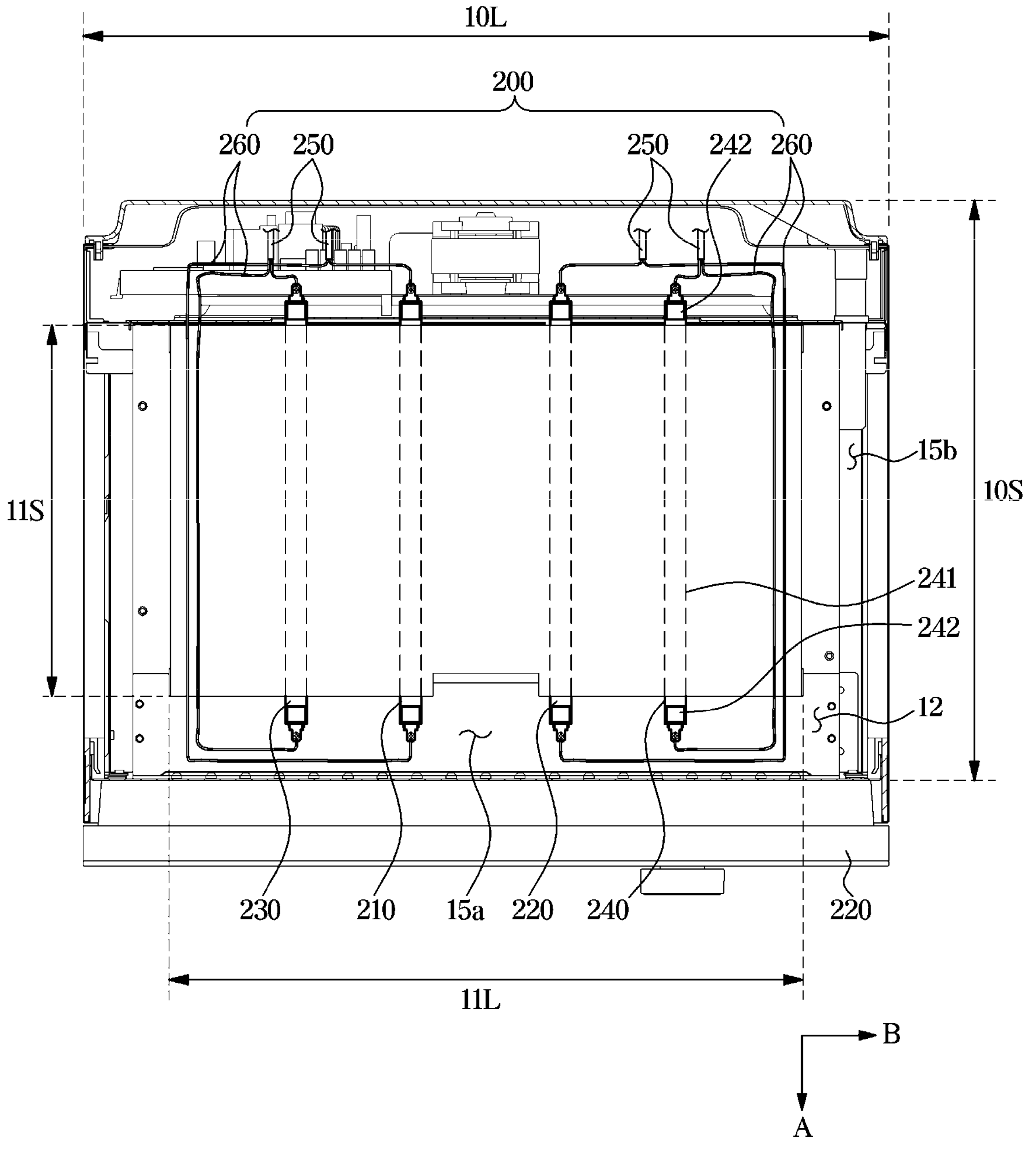
FIG. 5 is a plan view illustrating the cooking appliance according to the embodiment of the disclosure in a state in which some components of the cooking appliance are excluded.
Figure 6:
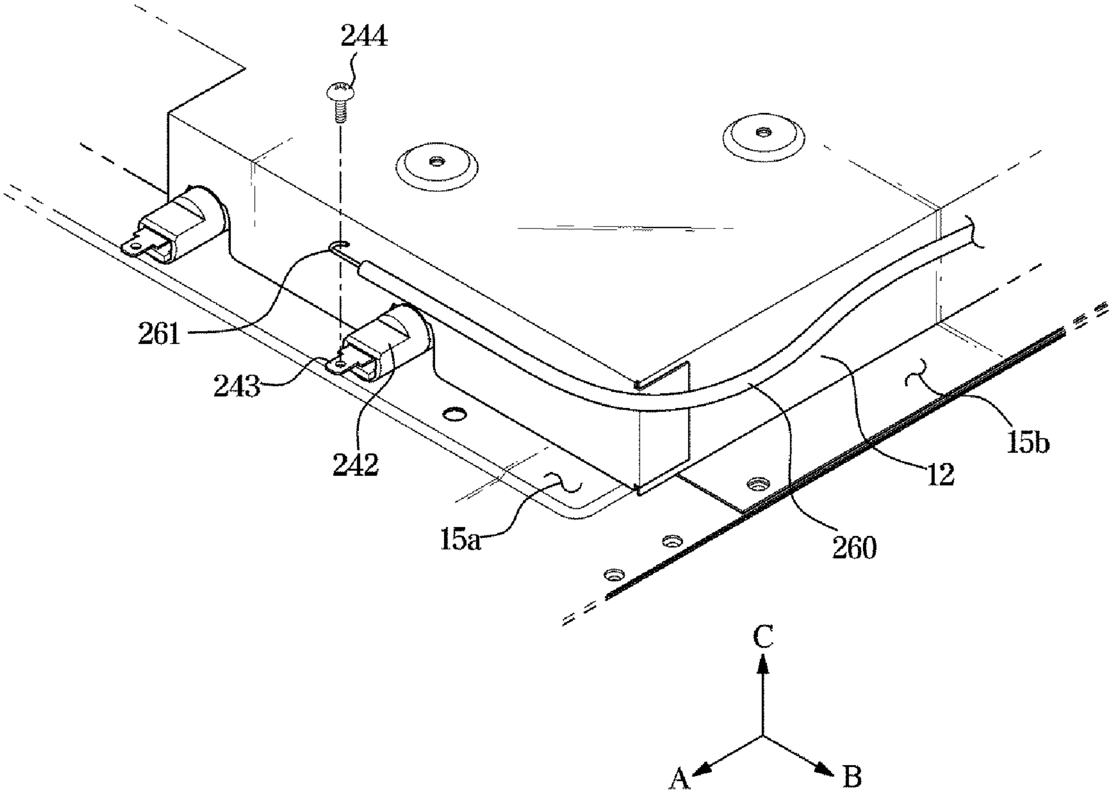
FIG. 6 is a view illustrating a coupling state of a heater and a wire of the cooking appliance according to the embodiment of the disclosure.

FIG. 4 is a view illustrating some components of the cooking appliance according to the embodiment of the disclosure. FIG. 5 is a plan view illustrating the cooking appliance according to the embodiment of the disclosure in a state in which some components of the cooking appliance are excluded. FIG. 6 is a view illustrating a coupling state of a heater and a wire of the cooking appliance according to the embodiment of the disclosure.

As described above, the plurality of heaters 210, 220, 230, and 240 are each provided to include the long axis 200L extending in the first direction A while being disposed to be spaced apart from each other in the second direction B corresponding to the long side 11L of the cooking chamber 11.

Referring to FIG. 4, the plurality of heaters 210, 220, 230, and 240 may include a first heater 210, a second heater 220, a third heater 230, and a fourth heater 240, but the disclosure is not limited thereto. For example, the disclosure may include the first heater 210 and the second heater 220, or may include more heaters than the four heaters 210, 220, 230, and 240.

Since the plurality of heaters 210, 220, 230, and 240 are all formed to be the same as each other, the description of the configuration of the plurality of heaters will be described in relation to the fourth heater 240. The plurality of heaters 210, 220, 230, and 240 each include a body portion 241 extending in the direction of the long axis 200L and generating heat on power and both end portions 242 disposed at both side ends of the body portion 241.

The both end portions 242 may be provided such that external power is supplied to the heater 240. The body portion 241 may be subject to heat generation by the power supplied from the both end portions 242, and heat from the heat generation may be transferred to the shelf 30.

The first heater 210 may be disposed on one side in the second direction B and the second heater 220 may be disposed at a side opposite to the first heater 210 in the second direction B.

In detail, the first heater 210 may be disposed on one side and the second heater 220 may be disposed on the opposite side with respect to a center line G of the cooking surface 32 in the second direction B. The third heater 230 may be disposed on the one side adjacent to the first heater 210, and the fourth heater 240 may be disposed on the opposite side adjacent to the second heater 220.

The first heater 210 and the third heater 230 may generate heat of the same temperature. In addition, the second heater 220 and the fourth heater 240 may generate heat of the same temperature.

The first and third heaters 210 and 230 may be provided to transfer heat of a temperature different from that of heat transferred by the second and fourth heaters 220 and 240. That is, the temperature transferred from one side with respect to the center line G and the temperature transferred from the opposite side may be provided to be different from each other.

The temperature of heat generated by each of the plurality of heaters 210, 220, 230, and 240 may be set to be the same, and during drive of the cooking appliance 1, the plurality of heaters 210, 220, 230, and 240 may be controlled such that the first and third heaters 210 and 230 are continuously driven and the second and fourth heaters 220 and 240 repeat on/off operations Conversely, the plurality of heaters 210, 220, 230 and 240 may be controlled such that the first and third heaters 210 and 230 are driven to repeat on/off operations and the second and fourth heaters 220 and 240 are continuously driven.

Accordingly, the total temperature of heat generated by the first and third heaters 210 and 230 may be different from the total temperature of heat generated by the second and fourth heaters 220 and 240.

However, the disclosure is not limited thereto, and the temperature of heat generated by the first and third heaters 210 and 230 may be provided to be different from the temperature generated by the second and fourth heaters 220 and 240.

The shelf 30 may include a first area 34 and a second area 35 formed on the cooking surface 32. The first area 34 and the second area 35 may be divided based on the second direction B.

In detail, the first area 34 may be formed on one side with respect to the center line G, and the second area 35 may be formed on the opposite side.

The first area 34 may be disposed at a position corresponding to the first and third heaters 210 and 230 in the third direction C. The second area 35 may be disposed at a position corresponding to the second and fourth heaters 220 and 240 in the third direction C.

As described above, since the temperature of heat transferred from the first and third heaters 210 and 230 is different from the temperature of heat transferred from the second and fourth heaters 240, the temperature of heat transferred to the first area 34 may be different from the temperature of heat transferred to the second area 35.

The first area 34 may be supplied with heat generated by the first and third heaters 210 and 230 from the upper surface 11*a*, and the second area 35 may be supplied with heat generated by the second and fourth heaters 220 and 240 from the upper surface 11*a*.

The first and second areas 34 and 35 may also be supplied with heat conducted from the heat generating portion 33. As described above, the heat generating portion 33 may be heated by the high frequency waves generated by the magnetron 310 disposed on the lower surface 11*b*, and the heat may be equally conducted to the first and second areas through the main body 31.

Since the heat transferred from the first and third heaters 210 and 230 is different from the heat transferred from the second and fourth heaters 240, the temperature of heat transferred to the first area 34 is different from the temperature of heat transferred to the second area 35. Accordingly, cooking objects having different cooking temperatures may be respectively placed in the first area 34 and the second area 35 and cooked in one cooking chamber 11 simultaneously.

In addition, since different cooking objects may be laterally positioned with respect to the first direction A, which is a forward direction of the cooking appliance 1, during cooking, the user may easily observe the cooking process of different cooking objects through the transparent member 22 in real time.

The short side 32S of the cooking surface 32 may extend in a direction perpendicular to the long side 32L and corresponding to the first direction A. As in the conventional technology, when the plurality of heaters 210, 220, 230, and 240 have a long axis extending in a direction corresponding to the long side 32L of the cooking surface 32, the plurality of heaters 210, 220, 230, and 240 may be disposed to be spaced apart in the first direction A.

In this case, when the direction in which the first area 34 and the second area 35 are divided is provided in the first direction A based on the plurality of heaters 210, 220, 230, and 240, the first area 34 and the second area 35 may not have enough length in one direction.

However, according to the embodiment of the disclosure, the plurality of heaters 210, 220, 230, and 240 of the cooking appliance 1 are disposed to be spaced apart from each other in the second direction B, so that the first area 34 and the second area 35 are divided in the second direction B, and because the long side 32L of the cooking surface 32 extends in the second direction B, the first area 34 and the second area 35 have a sufficient length in one direction.

That is, assuming that the length of the first area 34 in the second direction B is a first length 34*a* and the length of the second area 35 in the second direction B is a second length 35*a*, the first length 34*a* and the second length 35*a* may be provided in a length approximately large enough to have the entire cooking object within the first area 34 or the second area 35.

In other words, the first length 34*a* and the second length 35*a* may each formed to be longer than the length of a portion obtained by dividing the short side 32S of the cooking surface 32 in half, so that the cooking surface 32 may be partitioned such that the first area 34 and the second area 35 have a quadrangular shape that is substantially close to a square. That is, the cooking surface 32 may be efficiently partitioned.

Accordingly, the first area 34 and the second area 35 on which different cooking objects may be placed may have a size of 34*a**32S and a size of 35*a**32S, respectively. The first length 34*a* or the second length 35*a* may have a length substantially corresponding to the short side 32S of the cooking surface 32. Accordingly, the cross-sectional area of the first area 34 and the second area 35 may be provided in an approximately square shape, and the cooking object may be easily located within the first area 34 or the second area 35.

The first length 34*a* or the second length 35*a* is not limited thereto, and the first length 34*a* or the second length 35*a* may be formed to have a length different from the length of the short side 32S of the cooking surface 32, and the cross sectional area of the first area 34 and the second area 35 may have a rectangular shape.

However, the ratio of the short side 32S of the cooking surface 32 to the first length 34*a* or the second length 35*a* (34*a*/32S, 35*a*/32S) may be provided to be larger than the ratio of the long side 32L of the cooking surface 32 to a first length or a second length obtained when the first area 34 and the second area 35 are divided in the first direction A.

As described above, the plurality of heaters 210, 220, 230, and 240 may be spaced apart from each other in the second direction B.

In this case, the first and third heaters 210 and 230 may be disposed at a first separation distance d1 therebetween above the first area 34, and the second and four heaters 220 and 240 may also be disposed at the first separation distance of d1 therebetween above the second area 35.

However, the first heater 210 and the second heater 220 disposed above the different areas 34 and 35 while adjacent to each other may be disposed at a second separation distance d2 therebetween.

The second separation distance d2 may be formed to be the same as the first separation distance d1.

However, the disclosure is not limited thereto, and the second separation distance d2 may be longer than the first separation distance d1.

As described above, the cooking chamber 11 may have the long side 11L in the second direction B and the short side 11S in the first direction A. In addition, the cooking chamber may have a short side in the third direction C.

Accordingly, the housing 10 may have a long side 10L in the second direction B and a short side 10S in the first direction A to correspond to the shape of the cooking chamber 11 as shown in FIG. 5.

The plurality of heaters 210, 220, 230, and 240 may each have the long axis 200L extending in the first direction A while being spaced apart from each other in the second direction B. Accordingly, the both end portions 242 of the heater 240 may be arranged in the first direction A.

The body portion 241 of the heater 240 may be disposed at an inside of the inner housing 12 to be positioned inside the cooking chamber 11.

The both end portions 242 of the heater 240 may pass through the inner housing 12 to be disposed in the separation space 15 that is formed outside the cooking chamber 11.

The first heating source 200 includes a power supply 250 for supplying power to the heater 240 and a wire 260 coupled to the both end portions 242 to electrically connect the power supply 250 to the heater 240.

The wire 260 may be provided to be coupled to the both end portions 242 in the separation space 15 formed between the inner housing 12 and the housing 10.

As described above, the both end portions 242 of the heater 240 are arranged in the first direction A. Accordingly, the wire 260 may be coupled to the both end portions 242 inside a first separation space 15*a* formed by a difference between the short side 10S of the housing 10 and the short side 11S of the cooking chamber 11 in the separation space 15.

The distance of the first separation space 15*a* in the first direction A may be formed by a length between the short side 10S of the housing 10 and the short side 11S of the cooking chamber 11 as being very narrow. Accordingly, a difficulty may occur in assembling the heater 240 and the electric wire 260.

In the conventional technology, the both end portions 242 of the heater 240 may be arranged in the second direction B, so that the both end portions 242 may be coupled to the wire in a second space 15*b* formed by a length between the long side 10L of the housing 10 and the long side 11L of the cooking chamber 11.

In this case, the distance of the second separation space 15*b* in the second direction B may be formed by a length between the long side 10L of the housing 10 and the long side 11L of the cooking chamber 11 as being relatively wide. Accordingly, the wire 260 and the both end portions 242 may be easily assembled.

Therefore, the wire 260 and both end portions 242 may be easily coupled to each other by inserting the wire 260 into the both end portions 242 in the second direction B or the first direction A.

However, in the case of the cooking appliance 1 according to the embodiment of the disclosure, the both end portions 242 and the wire 260 can be coupled to each other in the first separation space 15*a*, which is very narrow, and when the wire 260 is inserted into the both end portions 242 in the first direction A or the second direction B, stable coupling is difficult due to stress resulting from the wire 260 excessively bent.

To alleviate the limitation, the cooking appliance 1 according to the embodiment of the disclosure may be provided such that the both end portions 242 of the heater 240 are coupled to the wire 260 in the third direction C as shown in FIG. 6.

Accordingly, even when the first separation space 15*a* is provided narrow, the wire 260 and the heater 240 may be stably coupled to each other. In particular, even though the first separation space 15*a* is formed with a short distance in the first direction A, the wire 260 and the both end portions 242 are coupled to each other in the third direction C, minimizing a stress resulting from a bent of the wire, which may occur when the wire 260 and the both end portions 242 are coupled in the first direction A or the second direction B, and thus enabling the wire 260 and the both end portions 242 to be stably coupled.

In detail, the wire 260 may include contact portions 261 that come in contact with the both end portions 242 to supply power. The both end portions 242 may include flanges 243 provided to come in contact with the contact portions 261 in the third direction C.

The both end portions 242 may include a coupling member 244 that allows the contact portion 261 to be coupled to the flange 243 in a state in which the flange 243 comes in contact with the contact portion 261.

The coupling member 244 may be provided with screws or the like. The coupling member 244 is coupled to the flange 243 in the third direction C while the contact portion 261 is in contact with the flange 243 in the third direction C, thereby holding the flange 243 and the contact portion 261 kept in contact.

As such, when the heater 240 and the wire 260 are assembled, the direction in which the heater 240 and the wire 260 are assembled is formed to correspond to the third direction C, so that the heater 240 and the wire 260 may be easily assembled even with narrowness of the first spaced space 15*a*, which is a space for assembling the heater 240 and the wire 260, in the first direction A or the second direction B.

Hereinafter, a cooking appliance 1 according to another embodiment of the disclosure will be described. Components except for a first heating source 400 and a shelf 30 corresponding thereto described below are the same as those of the cooking appliance 1 according to the above embodiment, and thus detailed descriptions thereof will be omitted.

Figure 7:
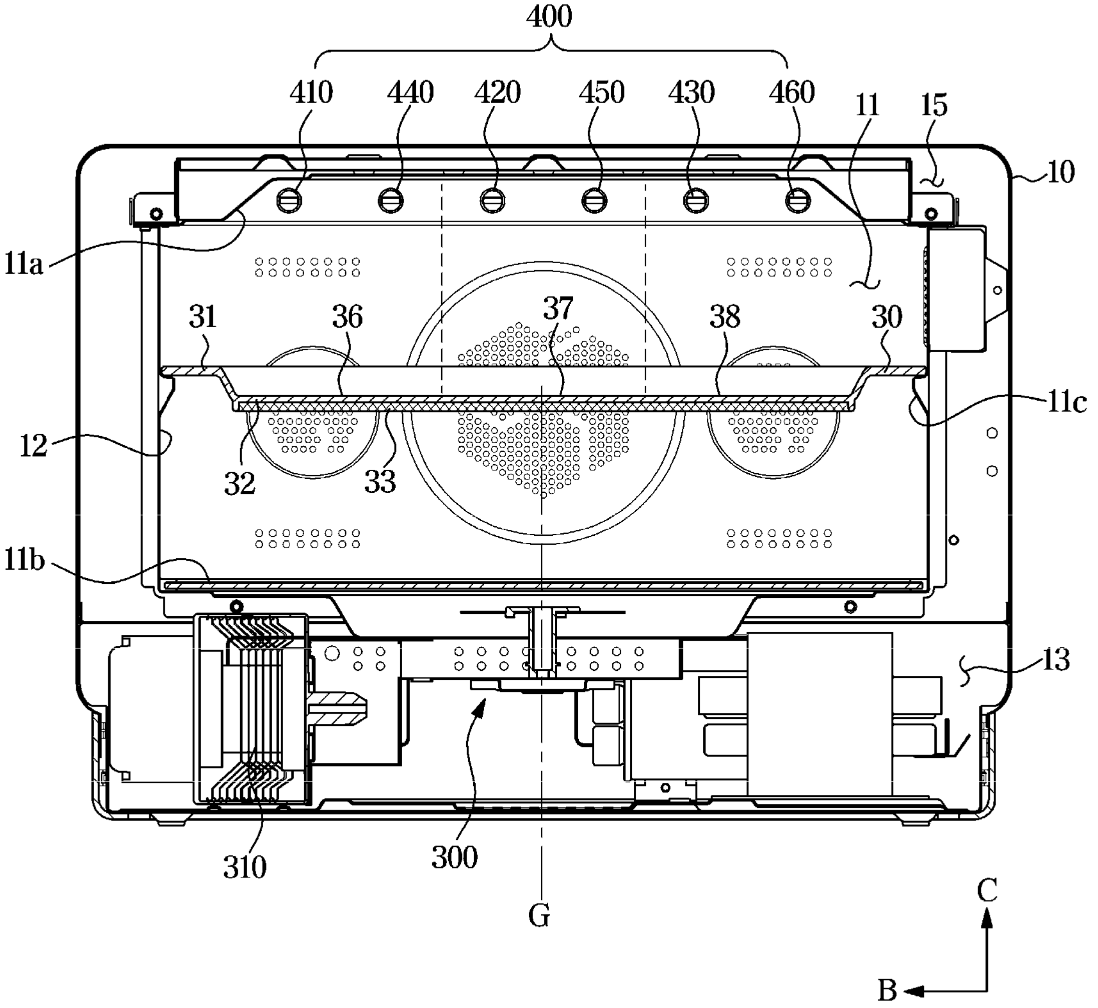
FIG. 7 is a cross-sectional view illustrating a cooking appliance according to another embodiment of the disclosure.

FIG. 7 is a cross-sectional view illustrating a cooking appliance according to another embodiment of the disclosure.

Referring to FIG. 7, the first heat source 400 may include six heaters 410, 420, 430, 440, 450, and 460. The six heaters 410, 420, 430, 440, 450, and 460 may be spaced apart from each other in the second direction B.

Although the six heaters 410, 420, 430, 440, 450, and 460 are described, the number of heaters is not limited thereto. For example, the heaters may include three heaters 410, 420, and 430.

The first heater 410 may be disposed on one side with respect to a center line G of the shelf 30 in the second direction B. The second heater 420 may be disposed adjacent to the center line G. The third heater 430 may be disposed on the opposite side with respect to the center line G.

The fourth heater 440 may be disposed adjacent to the first heater 410, the fifth heater 450 may be disposed adjacent to the second heater 420, and the sixth heater 460 may be disposed adjacent to the third heater 430.

The first heater 410 and the fourth heater 440 may generate heat of the same temperature. In addition, the second heater 420 and the fifth heater 450 may generate heat of the same temperature. In addition, the third heater 430 and the sixth heater 460 may generate heat of the same temperature.

The first and fourth heaters 410 and 440, the second and fifth heaters 420 and 450, and the third and sixth heaters 430 and 460 may transfer heat of different temperatures. That is, the temperature of heat transferred from one side with respect to the center line G, the temperature of heat transferred from the opposite side, and the temperature of heat transferred from the center line G may be provided to be different from each other.

The shelf 30 may include a first area 36, a second area 37, and a third area 38 formed on a cooking surface 32. The first area 36, the second area 37, and the third area 38 may be divided based on the second direction B.

In detail, the first area 36 may be formed on one side with respect to the center line G, the second area 37 may be formed on the center line G, and the third area 38 may be formed on the opposite side with respect to the center line G.

The first area 36 may be disposed at a position corresponding to the first and fourth heaters 410 and 440 in the third direction C. The second area 37 may be disposed at a position corresponding to the second and fifth heaters 420 and 450 in the third direction C. The third area 38 may be disposed at a position corresponding to the third and sixth heaters 430 and 460 in the third direction C.

As described above, since the temperature of heat transferred from the first and fourth heaters 410 and 440, the temperature of heat transferred from the second and fifth heaters 420 and 450, and the temperature of heat transferred from the third and sixth heaters 430 and 460 are different from each other, the temperatures of the heat transferred to the first area 36, the second area 37, and the third area 38 may be provided different.

Accordingly, with the cooking appliance 1 according to the embodiment of the disclosure, three different cooking objects having different cooking temperatures may be simultaneously cooked in the cooking chamber 11.

Hereinafter, a cooking appliance 1' according to another embodiment of the disclosure will be described. Components except for a second heating source 500 and a shelf 30' described below are the same as those of the cooking appliance 1 according to the above embodiment, and thus detailed descriptions thereof will be omitted.

Unlike the cooking appliance 1 of the above-described embodiment and the other embodiment, the cooking appliance 1' according to the embodiment of the disclosure will be described in relation to an oven as an example.

Figure 8:
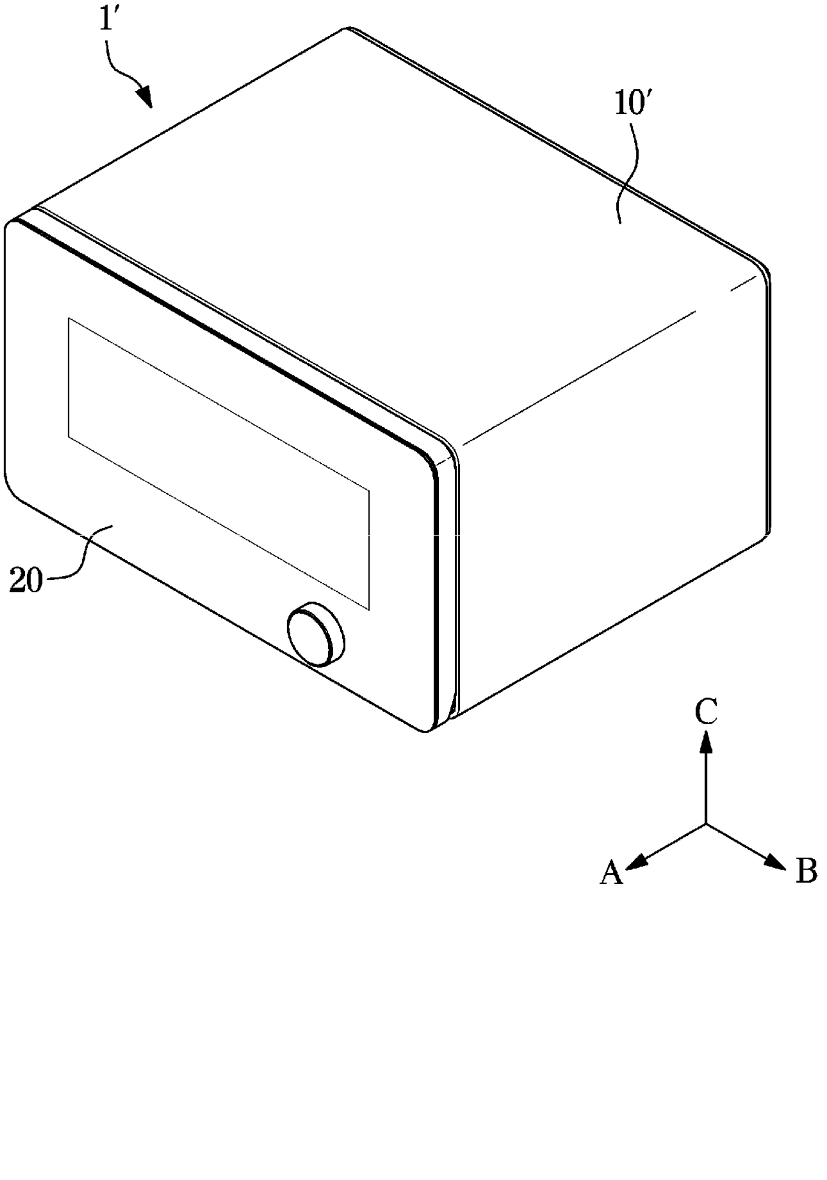
FIG. 8 is a perspective view illustrating the cooking appliance according to the embodiment of the disclosure.
Figure 9:
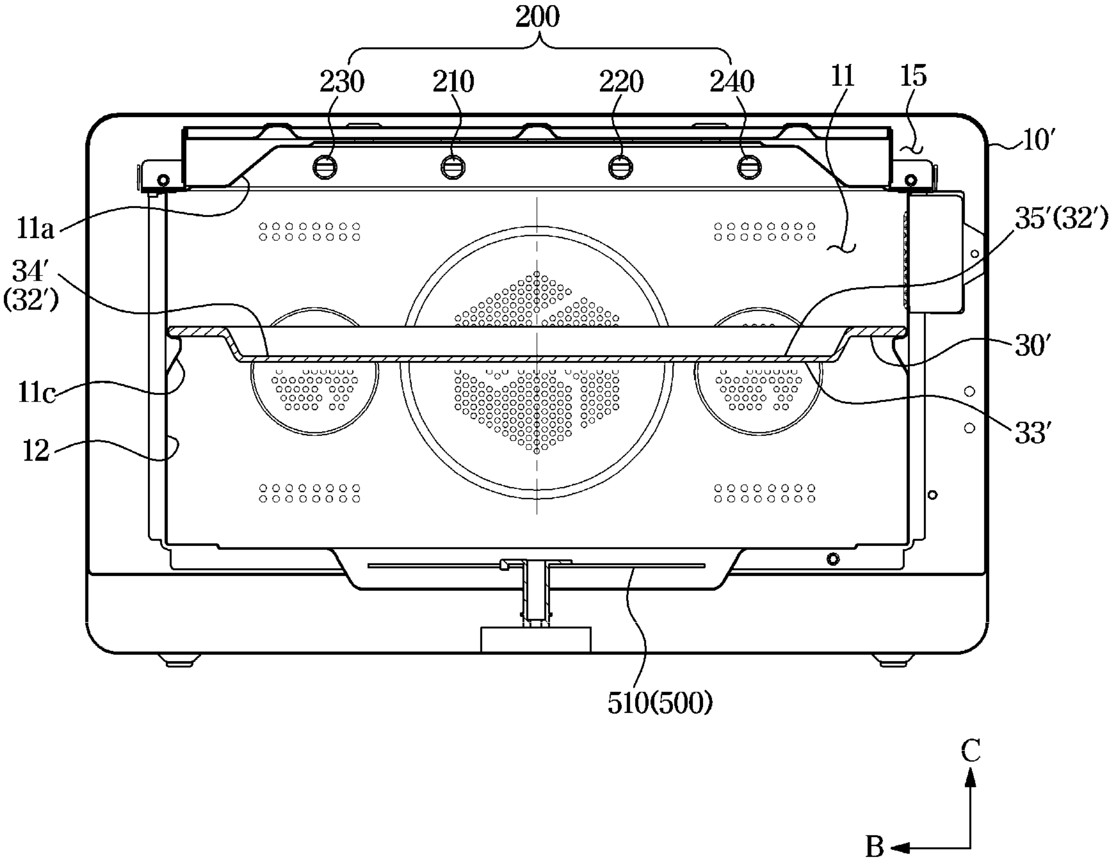
FIG. 9 is a cross-sectional view illustrating the cooking appliance according to the embodiment of the disclosure.

FIG. 8 is a perspective view illustrating a cooking appliance according to another embodiment of the disclosure, and FIG. 9 is a cross-sectional view illustrating the cooking appliance according to the embodiment of the disclosure.

The cooking appliance 1' may include a housing 10' forming the external appearance thereof and a door 20.

A first heating source 200 may be disposed on an upper surface 11*a* of a cooking chamber 11 formed inside the housing 10'. A second heating source 500 may be disposed on a lower surface 11*b* of the cooking chamber 11.

The second heating source 500 may include an auxiliary heater 510 that is caused to generate heat by supply of power. The auxiliary heater 510 may radiate the heat generated by itself and transfer the heat to a lower surface 33' of the shelf 30'.

Accordingly, lower sides of a first area 34' and a second area 35' formed in the cooking surface 32' of the shelf 30' may be supplied with the heat conducted from the lower surface 33'. In this case, the heat conducted to the first area 34 ' and the heat conducted to the second area 35' may have approximately the same temperature.

However, the temperatures of heat transferred to the first area 34' and the second area 35' through the first heating source 200 are provided to be different from each other, so that a plurality of cooking objects having different cooking temperatures may be respectively placed on the first area 34' and the second area 35' and cooked at different temperatures at the same time.

Hereinafter, a cooking appliance 1 according to another embodiment of the disclosure will be described. Components except for a plurality of heaters 210, 220, 230, and 240 of the cooking appliance described below are the same as those of the cooking appliance 1 according to the above embodiment, and thus detailed descriptions thereof will be omitted.

Figure 10:
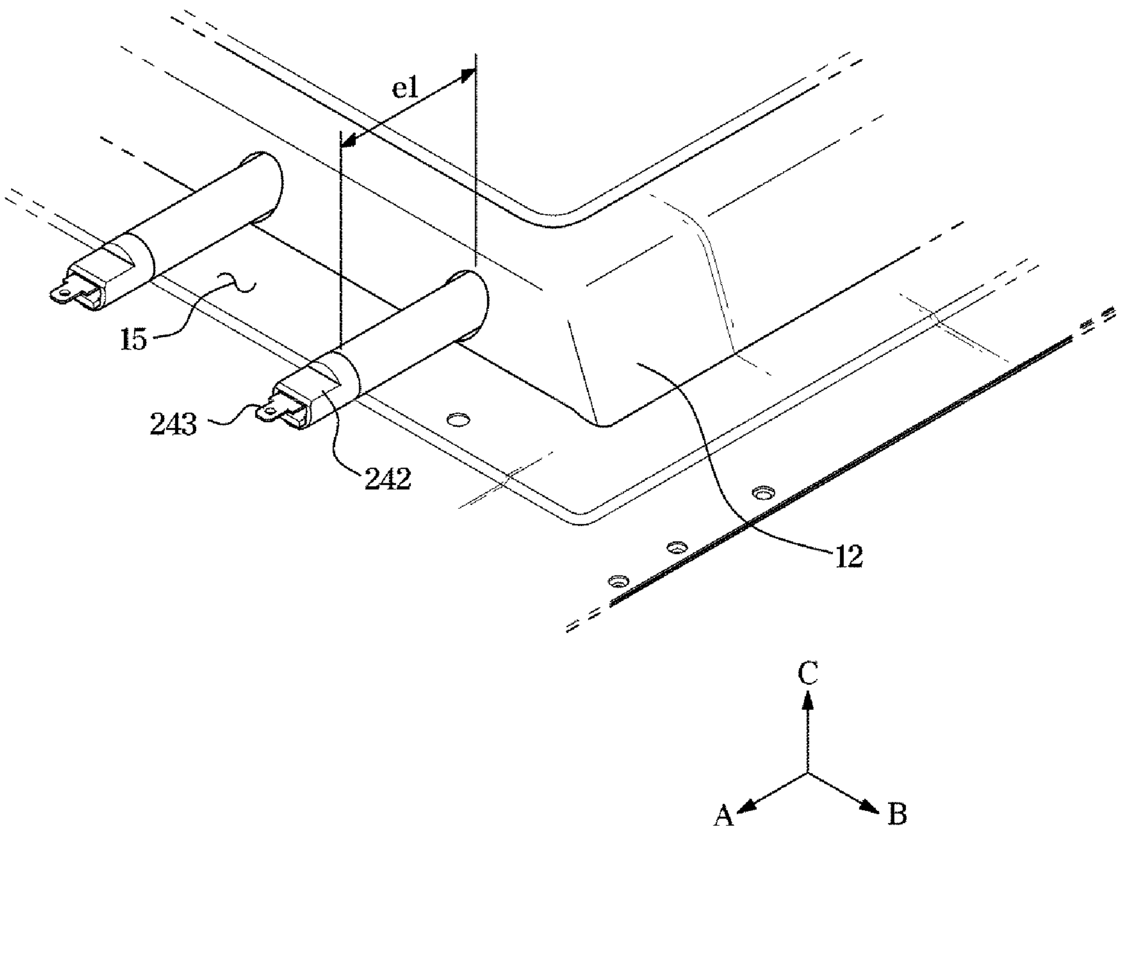
FIG. 10 is a view illustrating some components of the cooking appliance according to the embodiment of the disclosure.
Figure 11:
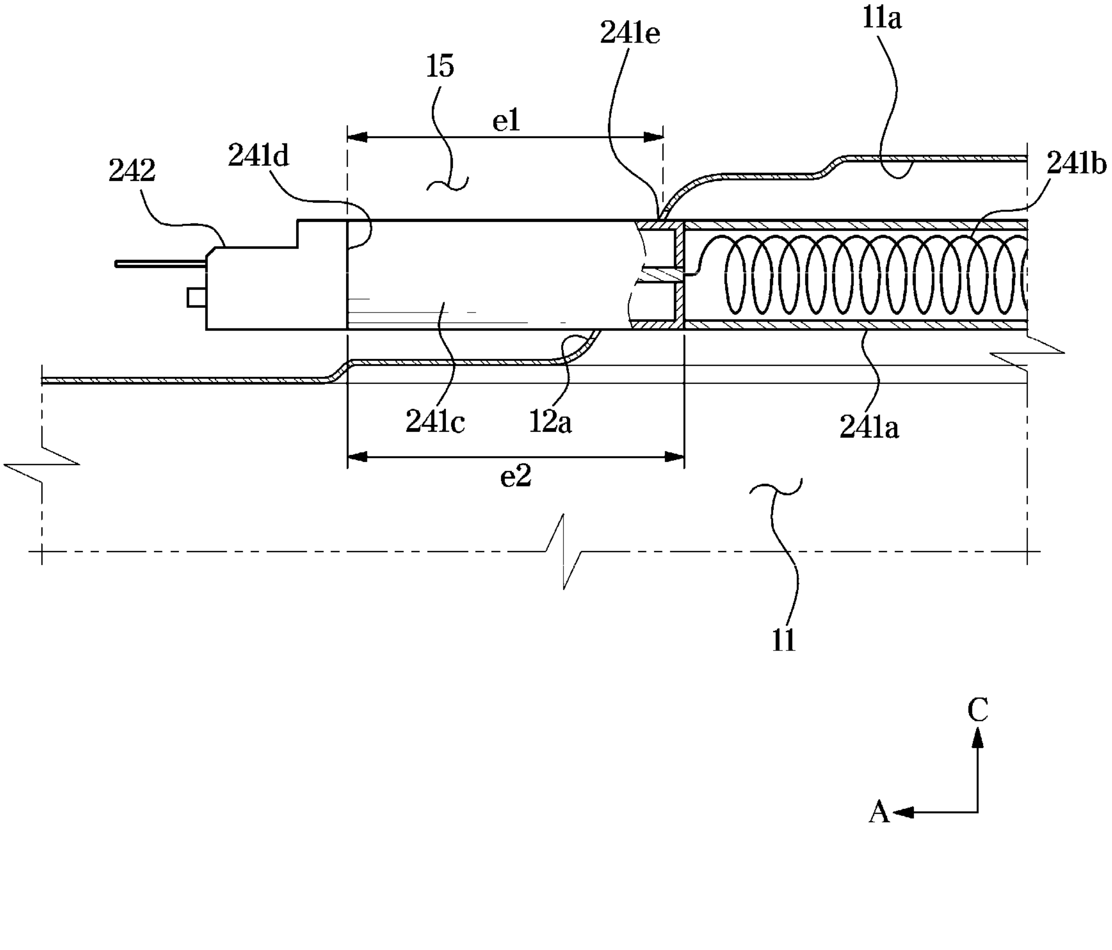
FIG. 11 is a schematic cross-sectional view illustrating some components of the cooking appliance according to the embodiment of the disclosure.

FIG. 10 is a view illustrating some components of a cooking appliance according to another embodiment of the disclosure. FIG. 11 is a schematic cross-sectional view illustrating some components of the cooking appliance according to the embodiment of the disclosure.

Since the plurality of heaters 210, 220, 230, and 240 are all formed to be the same as each other, the plurality of heaters 210, 220, 230, and 240 will be described in relation to the fourth heater 240

Referring to FIGS. 10 and 11, the heater 240 may include a body portion 241 including a heating area 241*a* which is an area where a heating element 241*b* is disposed and is caused to generate heat by the heating element 241*b*.

The body portion 241 of the heater 240 may include non-heating areas 241*c*, which are area where the heating element 241*b* is not disposed, between the heating area 241*a* and both end portions 242.

The non-heating areas 241*c* may be formed at both side ends of the heating area 241*a*.

The heating element 241*b* may be provided as, for example, a coil-shaped heating wire.

The non-heating area 241*c* may be provided with a component, such as a cold pin, disposed therein.

As described above, the high frequency waves oscillated from a magnetron 310 may be provided to the inside of the cooking chamber 11. In this case, when the high frequency waves leak to the outside of the cooking chamber 11, the safety of the user may be threatened. In particular, the disclosure performs cooking on the cooking object by simultaneously driving the heater 240 and the magnetron 310, and high frequency waves may leak out of the cooking chamber 11 through the heater 240.

In detail, a part of the high frequency waves propagating inside the cooking chamber 11 may reach the heater 240 and may leak to the outside of the cooking chamber 11 through the heating element 241*b* of the heater 240.

That is, at least a portion of the heater 240 passes through the inner housing 12 to be exposed to the separation space 15 formed outside the cooking chamber 11, and high frequency waves may leak to the outside along the at least a portion of the heater 240.

As described above, the both end portions 242 of the heater 240 may pass through the inner housing 12 to be disposed in the separation space 15 formed outside the cooking chamber 11. In this case, the high frequency waves may pass through a perforated portion of the inner housing 12 via the body portion 241 of the heater 240, moving to the outside of the cooking chamber 11.

To prevent such a limitation, the heater 240 may be installed on the housing 12 such that one end 241*d* of the body portion 241 has a separation distance e1 equal to or larger than a predetermined distance from a perforated wall 12*a* through which the heater 240 passes.

In addition, an extended length e2 of the non-heating area 241*c* in the first direction A, which is the extension direction of the heater 240, may be provided to be longer than the separation distance e1 between one end 241*d* of the body portion and the perforated wall 12*a*.

The separation distance e1 between the one end 241*d* of the body portion 241 and the perforated wall 12*a* may be calculated based on a farthest part of the perforated wall 12*a* from the one end 241*d* of the body portion 241 when the perforated wall 12*a* is disposed to be inclined with respect to the third direction C as in the disclosure.

That is, in the first direction A, the distance from the one end 241*d* of the body portion 241 to a point 241*e* of the body portion 241 at which the body portion 241 is maximally exposed to the outside may be determined as the separation distance e1 between the one end 241*d* of the body portion 241 and the perforated wall 12*a*.

As the non-heating area 241*c* has a predetermined extended length e2, the heating area 241*a* may be caused to be spaced from the one end of the body portion 241 by the extended length e2 of the non-heating area 241*c* in the first direction A.

As the extended length e2 of the non-heating area 241*c* is formed longer than the separation distance e1 between the one end 241*d* of the body portion 241 and the perforated wall 12*a*, the heating area 241*a* is disposed at an inner side of the perforated wall 12*a* without being exposed to the outside of the inner housing 12.

Accordingly, even when the high frequency waves are moved through the heating element 241*b* of the heating area 241*c*, because the one end of the heating element 241*b* is disposed inside the cooking chamber 11, high frequency waves may be prevented from leaking to the outside of the inner housing 12.

That is, forming the extended length e2 of the non-heating area 241*c* longer than the separation distance e1 between the one end 241*d* of the body portion 241 and the perforated wall 12*a* provides a distance value set to prevent the heating element 241*b* from being exposed outside of the inner housing 12.

Therefore, when the heater 240 is installed in the inner housing 12 such that the extended length e2 of the non-heating area 241*c* is formed longer than the separation distance e1 between the one end 241*d* of the body portion 241 and the perforated wall 12*a*, the high frequency waves may be prevented from leaking to the outside of the cooking chamber 11.

As is apparent from the above, a plurality of cooking spaces to which different temperatures of heat are provided by a plurality of heaters are efficiently arranged and divided, so that two different food items are easily disposed in the divided plurality of spaces in the cooking chamber, thereby facilitating simultaneous cooking of two different food items through the cooking appliance.

Although few embodiments of the disclosure have been shown and described, the above embodiment is illustrative purpose only, and it would be appreciated by those skilled in the art that changes and modifications may be made in these embodiments without departing from the principles and scope of the disclosure, the scope of which is defined in the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A cooking appliance comprising:

a housing;

a cooking chamber configured to cook food therein and openable in a first direction, the cooking chamber formed by an inner housing disposed inside the housing;

a shelf provided to be inserted into the cooking chamber in the first direction and on which food is placed;

a plurality of heaters configured to supply heat to the food and disposed at one side of the cooking chamber, each of the heaters including a body portion extending in the first direction and an electricity connector disposed at an end portion of the body portion in the first direction and electrically connected to a power supply;

a wire connecting the power supply to each electricity connector; and a magnetron disposed in the housing and configured to supply high frequency waves to the cooking chamber, wherein:

the plurality of heaters are arranged spaced apart from each other in a second direction perpendicular to the first direction, disposed on an upper side of the shelf, and each is supplied electricity by the power supply, the electricity connector of each of the heaters is coupled to the wire in a third direction perpendicular to both the first direction and the second direction, the shelf includes a long side extending in the second direction and a cooking surface including a first area and a second area arranged in the second direction to correspond to an arrangement of the plurality of heaters, the inner housing includes a perforated wall through which the each of the heaters passes, the body portion of the each of the heaters includes a heating area in which heat is generated by a heating element and a non-heating area formed between the heating area and the end portion of the body portion, the non-heating area having an overall length, wherein the non-heating area does not include any portion of the heating element, the non-heating area extends from the cooking chamber to a separation space formed between the inner housing and the housing through the perforated wall to prevent the high frequency waves from leaking to an outside of the cooking chamber, a first portion of the overall length of the non-heating area is disposed outside the cooking chamber and inside the separation space and a second portion of the overall length of the non-heating area is disposed inside the cooking chamber, a length of the first portion extended to the outside of the cooking chamber is formed to be longer than a length of the second portion extended to an inside of the cooking chamber, the plurality of heaters further include a first heater disposed to correspond to and to be spaced apart in the third direction from the first area, and a second heater disposed to correspond to and to be spaced apart in the third direction from the second area, and the first heater is provided to generate an amount of heat that is equal to or greater than an amount of heat generated by the second heater.

2. The cooking appliance of claim 1, wherein the plurality of heaters generate heat independent of each other.

3. The cooking appliance of claim 1, wherein the shelf includes a short side extending in the first direction.

4. The cooking appliance of claim 1, wherein the electricity connector includes a flange extending in the first direction and a fastening member fastened to the flange in the third direction such that the flange is coupled to the wire.

5. The cooking appliance of claim 1, wherein the shelf further includes a third area arranged between the first area and the second area in the second direction, the plurality of heaters further include a third heater disposed to correspond to and to be spaced apart in the third direction from the third area, and the plurality of heaters are provided to supply a different amount of heat to each of the first area, the second area, and the third area.

6. The cooking appliance of claim 1, wherein the shelf further includes a heat generating portion that is heated by the high frequency waves generated by the magnetron.

7. The cooking appliance of claim 6, wherein:

the shelf further includes a first surface in which the first and second areas are located and a second surface opposite to the first surface in the third direction on which the heat generating portion is arranged, and the heat generating portion is provided to cover the first and second areas in the second direction.

8. The cooking appliance of claim 7, wherein the heat generating portion is configured to supply a same amount of heat to each of the first area and the second area.

9. The cooking appliance of claim 7, wherein the heat generating portion is formed of ferrite.

10. The cooking appliance of claim 1, further comprising an auxiliary heater disposed at a side opposite to the plurality of heaters in the housing, the auxiliary heater configured to supply heat to the cooking chamber.

11. The cooking appliance of claim 1, wherein the non-heating area includes a first end connected to the end portion of the body portion and a second end connected to the heating area, and wherein the non-heating area passes through the perforated wall such that an extended length between the first end and the second end is longer than a separation distance between the first end and the perforated wall.

12. A cooking appliance comprising:

a cooking chamber configured to cook food therein and openable in a first direction;

a shelf provided to be inserted into the cooking chamber in the first direction and on which food is placed; and a plurality of heaters configured to supply heat to the food and disposed at one side of the cooking chamber, wherein:

the shelf includes a short side extending in the first direction and a long side extending in a second direction perpendicular to the first direction, each of the plurality of heaters includes a body portion extending in the first direction and an electricity connector disposed at an end portion of the body portion in the first direction and electrically connected to a power supply via a wire, the electricity connector being coupled to the wire in a third direction perpendicular to both the first direction and the second direction, the body portion of each of the heaters includes a heating area in which heat is generated by a heating element and a non-heating area formed between the heating area and the end portion of the body portion, the non-heating area having an overall length, wherein the non-heating area does not include any portion of the heating element, a first portion of the overall length of the non-heating area is disposed outside the cooking chamber and a second portion of the overall length of the non-heating area is disposed inside the cooking chamber, a length of the first portion extended to an outside of the cooking chamber is formed to be longer than a length of the second portion extended to an inside of the cooking chamber, the plurality of heaters are arranged spaced apart from each other in the second direction, disposed on an upper side of the shelf, and each of the plurality of heaters is supplied electricity by the power supply, the shelf includes a first area arranged at a first side in the second direction and a second area arranged at a second side in the second direction, the plurality of heaters include a first heater disposed to correspond to and to be spaced apart in the third direction from the first area, and a second heater disposed to correspond to and to be spaced apart in the third direction from the second area, and the first heater is provided to supply more heat to the first area than an amount of heat supplied to the second area by the second heater.

13. The cooking appliance of claim 12, wherein a third heater among the plurality of heaters is disposed between the second heater and the first heater.

14. A cooking appliance comprising:

a housing;

a cooking chamber configured to cook food therein and openable in a first direction, the cooking chamber formed by an inner housing disposed inside the housing;

a shelf provided to be inserted into the cooking chamber in the first direction and on which food is placed; and a heating source configured to supply heat, wherein:

the heating source includes a plurality of heaters disposed at one side of the cooking chamber and configured to supply heat to the food and a magnetron disposed in the housing and configured to generate high frequency waves to be supplied to the cooking chamber, each of the plurality of heaters extends in the first direction and is arranged spaced apart from each other in a second direction perpendicular to the first direction, disposed on an upper side of the shelf, each of the heaters including a body portion extending in the first direction and electricity connectors disposed at both end portions of the body portion in the first direction and electrically connected to a power supply via a wire, the electricity connectors being coupled to the wire in a third direction perpendicular to both the first direction and the second direction, each of the heaters supplied electricity by the power supply, the shelf includes a long side extending in the second direction and a cooking surface including a first area and a second area arranged in the second direction to correspond to an arrangement of the plurality of heaters, the body portion of each of the heaters includes a heating area in which heat is generated by a heating element and a non-heating area formed between the heating area and the end portion of the body portion, the non-heating area having an overall length, wherein the non-heating area does not include any portion of the heating element, a first portion of the overall length of the non-heating area is disposed outside the cooking chamber and a second portion of the overall length of the non-heating area is disposed inside the cooking chamber, a length of the first portion extended to an outside of the cooking chamber is formed to be longer than a length of the second portion extended to an inside of the cooking chamber, the inner housing includes a perforated wall through which each of the heaters passes, the body portion of the each of the heaters includes both ends disposed at both sides of the body portion and spaced apart from the perforated wall in the first direction such that the both ends are provided outside of the cooking chamber, the plurality of heaters further include a first heater disposed to correspond to and to be spaced apart in the third direction from the first area, and a second heater disposed to correspond to and to be spaced apart in the third direction from the second area, and the first heater is provided to generate an amount of heat that is equal to or greater than an amount of heat generated by the second heater.

* * * * *